A. P. Barlow. Sheet 1. 2 Sheets.

Saw Mill.

No. 3878. Reissued Mar. 15. 1870

A. P. Barlow Sheet 2. 2 Sheets.

Saw Mill.

No. 3878. Reissued Mar. 15. 1870.

UNITED STATES PATENT OFFICE.

ASHBELL P. BARLOW, C. H. EASTMAN, W. W. KING, Z. B. SMALL, AND JAMES H. JOHNSON, OF CLAREMONT, NEW HAMPSHIRE, ASSIGNEES OF ASHBELL P. BARLOW.

IMPROVEMENT IN SAW-MILLS.

Specification forming part of Letters Patent No. 72,155, dated December 17, 1867; reissue No. 3,878, dated March 15, 1870.

*To all whom it may concern:*

Be it known that I, ASHBELL P. BARLOW, formerly of Claremont, in the county of Sullivan, in the State of New Hampshire, but now of Kalamazoo, in the county of Kalamazoo, in the State of Michigan, did invent certain new and useful Improvements in Saw-Mills, and obtained Letters Patent therefor, which patent is dated December 17, 1867; and I do hereby declare that the following amended specification is a full and exact description of the invention, reference being had to the accompanying drawings and to the letters of reference marked thereon.

This invention relates to improvements in that kind of mills known as "muley-saw mills," and in which reciprocating saws are used; and the invention consists in the construction of the guide-ways which give the position of the saw in its reciprocation, the cross-head which is attached to the saw and slides upon the guides, the contrivance for attaching the saw to the pitman, the construction of the pitman-head, and in the combination of the construction of the upper guides with the upper cross-head, saw, lower guides, and pitman-head.

Figure 1:
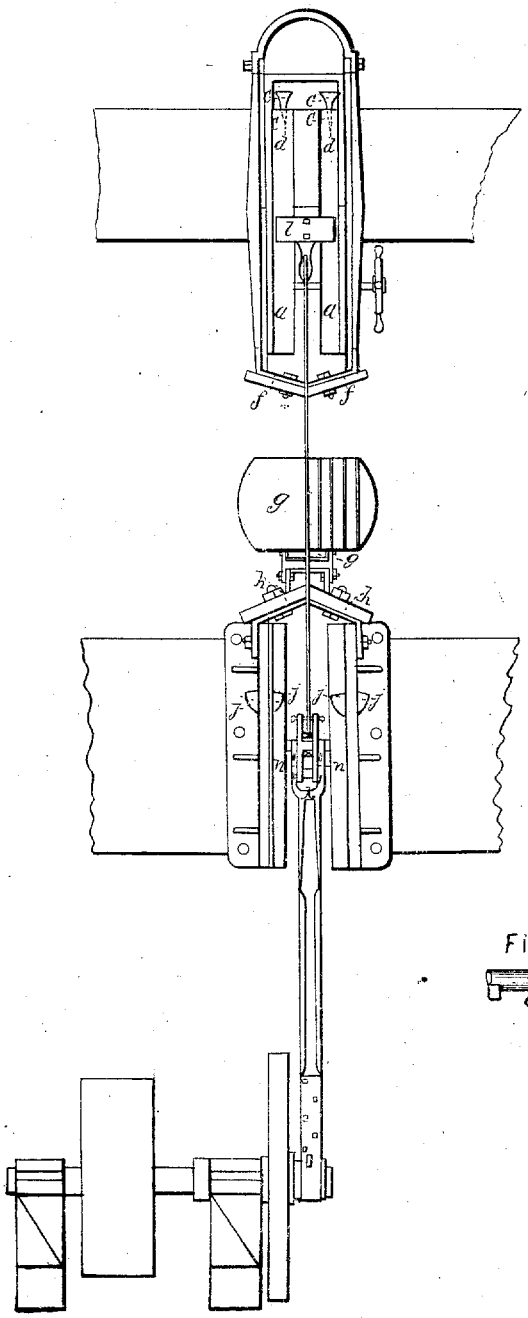
Figure 6:
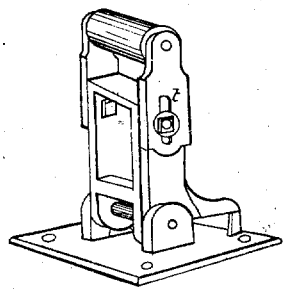
Figure 7:
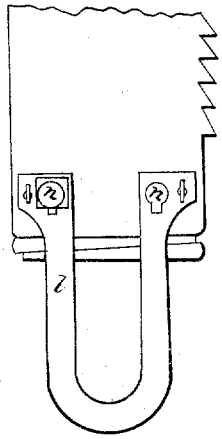
Figure 8:
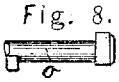

Figure 1 in the drawings is an upright front view of the mill. Figs. 2, 3, 4, 5, 6, 7, 8, 9, and 10 are views of the parts which enter into the construction of the whole.

In the drawings, common muley-heads or blocks are used, and to which my improvements are attached or connected.

Figure 2:
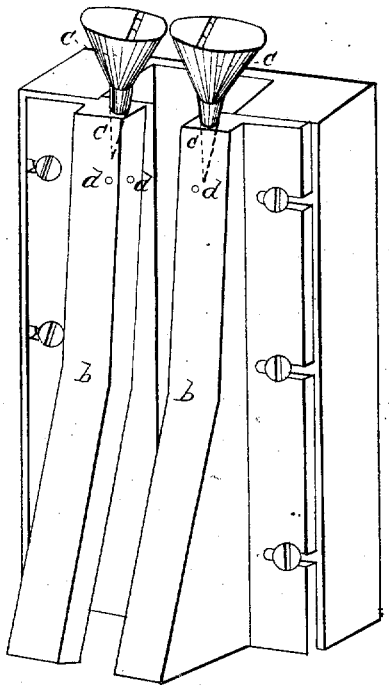
Figure 3:
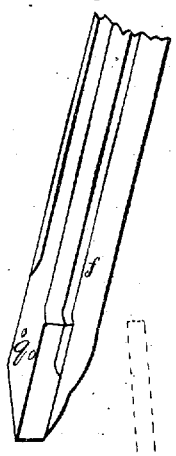
Figure 10:
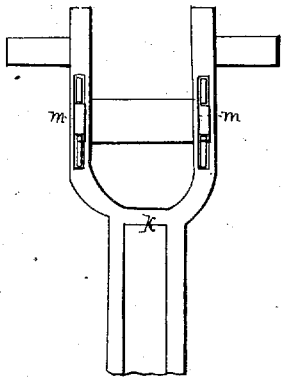
Figure 4:
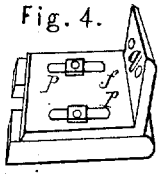
Figure 9:
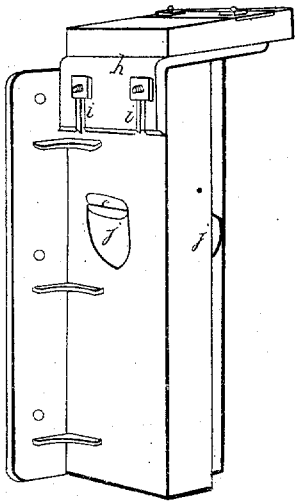
Figure 5:
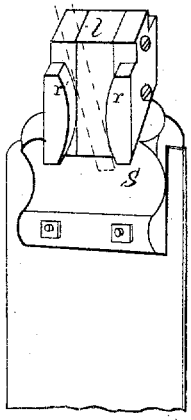

*a a* are the upper guides, constructed as shown in Fig. 2, and attached to the muley-blocks, and are slightly inclined forward from a perpendicular drawn from the top of said guides, for one-half of their length, downward to or near the point *b*, when the inclination is made much greater from the point *b* to the lower ends of said guides. The faces of these guides are straight from the top to the point *b*, and from that point to the bottom, but at the point *b* there is an obtuse angle formed by the two right lines. The inclination from the top of the upper guides to the point *b* may be one-half inch, more or less, proportional according to the length of the reciprocation of the saw, but generally the inclination of the lower part of the guides from *b* to the bottom is two or three times as much as the upper part of the guide. *e* is the cross-head, constructed as seen in Fig. 5, with the curved lips or flanges *r r* projecting, so as to embrace the guides *a a*. The curved form of the lips *r r* of cross-head *e* allows of its easy reciprocation over the obtuse angle at *b* of the guides *a a* without jar or strain, and at same time keeps the faces of the guides and lips perfectly lubricated. The lower portion of cross-head *e* is cut or hollowed out at *s*, and slotted from the bottom to receive the saw, and forms a spring-clamp, which construction enables it to grasp the saw firmly without having to break the thread off from the screw-bolts while tightening the nut on the screw-bolt. To the lower end of the saw is the saw-buckle *l*, (see Fig. 7,) which attaches the saw to the bifurcated pitman *k*, as seen in Fig. 10. The saw-buckle *l* is attached to the saw by means of gib-bolt *o* passing through holes in the buckle and saw-plate. Gib-bolt *o* has a projection on one side of its forward or entering end, like or similar to a lock-key. The holes through the buckle have a slot at their lower sides, and the saw has a slot or elongated hole, so that, as the keys at the bottom end of the saw are driven, it raises the saw up with relation to the buckle, by which means the saw-plate is interposed to prevent the bolt *o* from ever getting loose or out of place. The projecting or key part of the bolt, when the bolt is inserted and partially turned around in the holes of the buckle, forms a shoulder, against which the buckle is forced in adjusting the saw laterally by means of the temper or set screws that go through the buckle and bear against the saw. The buckle *l* extends downward and embraces the pivot-pin in the bifurcated part of the pitman. This pivot-pin is placed transversely across and goes through slots in the two limbs of the pitman, and is adjusted in its height by the keys in the slots *m m*, as seen in Fig. 10. Upon each limb of the bifurcated pitman is projected a guide-pin, as seen in said Fig. 10. These guide-pins enter into and work in grooves in the side plates of the lower muley-heads. It is manifest that the adjustable pivot-pin *m* may be placed in different positions with relation to the guide-pins on the bifurcated pitman without departing from the spirit of this invention. By this construction and arrangement of the upper guides having two different inclinations in their length, the upper cross-head, with the bifurcated pitman having the guide-pins and adjustable pivot-pin forming a fulcrum by which the bottom of the saw is thrown forward at the commencement of the downward stroke, increasing in degree until the crank-pin has made a quarter revolution, when the fulcrum or pivot pin causes a decrease of the advance of the bottom of the saw to the half revolution, and the saw has finished its cut and begins to rise when the lateral movement of the bottom of the saw is reversed from what was the case in its downward motion. While the crank was making a half revolution the top of the saw has been advanced slightly forward to point *b* on the guides, where it is, in its downward stroke, suddenly increased in its forward advance until the half revolution of the crank has been made and the stroke of the saw completed and the cut made, when, as the saw commences to rise, it is moved laterally back out of contact with the timber, and the log is free to be advanced to receive another cut from the saw.

It will be observed that the motion of the saw in its reciprocations is not in a right line, but that its position in such reciprocations is continually being changed, for the two inclinations upon the top guides cause a change in the top of the saw, and the bottom end is being continually changed by the angle at which the pitman may be with relation to the revolution of the crank, and by which arrangement I am enabled to give the saw, and the several teeth in the saw as they come in contact with the timber, commencing at the bottom of the log, an equal cutting capacity in the entire downward or effective stroke, and when such stroke is made, to instantly withdraw the teeth of the saw from the timber, and the saw is free to rise.

*c c* are oil-cups connected with holes or slots made in the top of the slides, so that, when the cups are filled with oil, it runs slowly out of the holes on the face of the slides at *d d*. *f f* show an improved method of attaching the adjustable saw-guides to the muley-heads. *g* is a section of a log having an adjustable supporting-roller underneath it to hold the log from springing downward and prevent trembling while the saw is cutting away the timber. *h h* are adjustable saw-guides upon the lower muley-heads, (see Figs. 1 and 9,) and the manner of holding and adjusting them by screw-bolts in slots *i i*. *j j* are oil cups or boxes on the lower muley-heads. *n n* are slotted holes in the saw-buckle *l* to receive bolt *o*.

I am aware that straight inclines the whole length of the guides have been used in order to give the saw in its downward stroke an advance into the timber. Such construction I do not claim; nor do I claim for a curved slide, in order to advance the saw, as that is in use. Pivoting the saw at its bottom end above or below the guide-pins, in order to make the guide-pins a fulcrum by which the changing position of the pitman in the revolution of the crank will change the position of the bottom end of the saw laterally, I do not claim, broadly; but Having fully described my invention, what I desire to secure by Letters Patent is—

1. The ways or guides *a a*, constructed on their faces with the two different inclinations, or double inclines and parallel sides, substantially as shown and described.

2. The cross-head *e*, provided with the projecting convex faces *r r* and spring-clamp jaws *s*, constructed to operate substantially as described.

3. The saw-buckle *l*, perforated and slotted as described, in combination with the gib-bolts *o*, as set forth.

4. The hollow or bifurcated pitman *k*, slotted at *m*, and provided with adjusting-keys for varying the distance of the saw pivot-pin from the pitman, fulcrum, or guide-pins on the pitman, in the manner and for the purpose set forth.

5. The combination of the upper guides *a a*, having the two different inclinations, as described, and the cross-heads *e*, with the saw and the pitman *k*, when the saw is pivoted to the pitman in the manner and for the purpose substantially as described.

ASHBELL P. BARLOW.

Witnesses:

N. CRAWFORD,

EDM. F. BROWN.